(12) United States Patent
Henschke et al.

(10) Patent No.: US 8,017,204 B2
(45) Date of Patent: Sep. 13, 2011

(54) COMPOSITION SUITABLE FOR THIN-WALL INJECTION MOLDED ARTICLES

(75) Inventors: Olaf Henschke, Cham (CH); Enrique Torres, Thalwil (CH)

(73) Assignee: Dow Global Technologies LLC, Midland, MI (US)

( * ) Notice: Subject to any disclaimer, the term of this patent is extended or adjusted under 35 U.S.C. 154(b) by 246 days.

(21) Appl. No.: 12/515,454

(22) PCT Filed: Jan. 9, 2008

(86) PCT No.: PCT/US2008/050612
§ 371 (c)(1),
(2), (4) Date: May 19, 2009

(87) PCT Pub. No.: WO2008/088995
PCT Pub. Date: Jul. 24, 2008

(65) Prior Publication Data
US 2010/0055362 A1 Mar. 4, 2010

(51) Int. Cl.
*B29D 22/00* (2006.01)
*B29D 23/00* (2006.01)
*B32B 1/08* (2006.01)

(52) U.S. Cl. ... 428/35.7; 428/220; 428/36.9; 428/36.91; 428/36.92; 428/500; 525/88; 525/191; 525/240; 525/241

(58) Field of Classification Search ............... 428/35.7, 428/220, 36.9, 36.91, 36.92, 500; 525/88, 525/191, 240, 241
See application file for complete search history.

(56) References Cited

U.S. PATENT DOCUMENTS

| 5,008,204 | A | 4/1991 | Stehling |
| 5,272,236 | A | 12/1993 | Lai et al. |
| 5,278,272 | A | 1/1994 | Lai et al. |
| 5,504,172 | A | 4/1996 | Imuta et al. |
| 5,763,534 | A | 6/1998 | Srinivasan et al. |
| 6,245,856 | B1 | 6/2001 | Kaufman et al. |
| 6,960,635 | B2 | 11/2005 | Stevens et al. |
| 7,109,269 | B2 | 9/2006 | Stevens et al. |
| 2004/0077787 | A1 | 4/2004 | Karande et al. |
| 2006/0058434 | A1 | 3/2006 | Watanabe |

FOREIGN PATENT DOCUMENTS

| EP | 0057981 A2 | 8/1982 |
| WO | 9304486 | 3/1993 |
| WO | 0001745 | 1/2000 |
| WO | 2004016663 A1 | 2/2004 |

OTHER PUBLICATIONS

Iida et al., Tetrahedron Lett., 42, pp. 4841-4844, 2001.
Scholte, et al., J. Appl. Polym. Sci., 29, 3763-3782 (1984).

(Continued)

*Primary Examiner* — Michael C Miggins
(74) *Attorney, Agent, or Firm* — Whyte Hirschboeck Dudek S.C.

(57) ABSTRACT

Compositions suitable for manufacturing injection molded articles having a minimum wall thickness of from 500 μm to 2.0 mm comprise from: (A) 2 to 15% by weight of a propylene-ethylene copolymer having substantially isotactic propylene sequences; (B) 85 to 98% by weight of a random polypropylene copolymer having from 2.5 to 5.0% by weight units derived from ethylene and a melt flow rate of from 25 to 130 grams/10 minutes (g/10 min); and (C) 500 to 2500 ppm by weight of a nucleator/clarifier additive (based on the weight of the random polypropylene copolymer). Typically, the melt flow rate of the compositions is from 20 to 125 g/10 min, and the propylene-ethylene copolymer comprises at least 75% by weight propylene and has a melt flow rate from 4 to 30 g/10 min.

17 Claims, 8 Drawing Sheets

OTHER PUBLICATIONS

Otocka et al., Macromolecules, vol. 4, No. 4, pp. 507-514, Jul.-Aug. 1971.

Wild et al., Journal of Polymer Science: Polymer, Physics Ed., 20, pp. 441-455, 1982.

Randall, Journal of Macromolecular Science, Reviews in Macromolecular Chemistry and Physics, C29 (2&3), 201-317, 1989.

ern pertains to thermoplastic compositions suitable for use in the manufacture of thin-wall injection molded articles having a wall thickness of 500 μm to 2.0 millimeters, which exhibit good optics, toughness and tensile-yield strength. Additionally, the invention pertains to thin-wall injection molded articles incorporating the inventive composition. Further, the invention pertains to injection molded articles, such as crates, boxes, pails, houseware articles, furniture, drinking cups, caps and closures and others that incorporate the inventive composition of the invention.

COMPOSITION SUITABLE FOR THIN-WALL INJECTION MOLDED ARTICLES

FIELD

This invention pertains to thermoplastic compositions suitable for use in the manufacture of thin-wall injection molded articles having a wall thickness of 500 μm to 2.0 millimeters, which exhibit good optics, toughness and tensile-yield strength. Additionally, the invention pertains to thin-wall injection molded articles incorporating the inventive composition. Further, the invention pertains to injection molded articles, such as crates, boxes, pails, houseware articles, furniture, drinking cups, caps and closures and others that incorporate the inventive composition of the invention.

BACKGROUND

Polypropylene is widely used because of its high versatility and relatively good temperature resistance. Its rigidity and low density makes it a cost-effective material of choice for many injection molded articles across a range of applications. Today the lack of toughness in polypropylene homopolymers, especially at low temperatures, is overcome by adding in-reactor rubbers. The resulting impact copolymers do have a very good stiffness/impact balance and are available at melt flow rates (230° C., 2.16 kg) from fractional MFR up to more than 100 g/10 min. An unmet need in injection molding applications requiring both stiffness and toughness is a polypropylene that provides good optical properties, such as low haze and high clarity, and shows less sensitivity to stress whitening. The combination of properties should be available at a high melt flow rate to allow for short cycle times and advantaged economics in the production of thin-wall (500 μm to 2.0 mm) injection molded articles.

Historically transparent articles are injection molded with clarified random polypropylene copolymers with reduced crystallinity. The lower stiffness compared to homopolymers can be compensated by the article design. As in polypropylene homopolymers the lack of toughness, especially at low temperatures, requires the addition of at least one rubber component for most applications; especially, where the articles will be transported at low temperature.

Compositions containing blends of random polypropylene copolymers with low crystallinity polyethylenes, e.g. metallocene polyethylene, require relatively high levels of impact modifier in order to achieve a significant improvement in impact resistance. The addition of these high levels of impact modifier is difficult in an injection molding machine and results in an unacceptable cost increase.

Commercial products are available which comprise in-reactor ethylene-propylene rubber and a random polypropylene copolymer. These products are less transparent compared to unmodified random copolymers, offer a fixed level of impact resistance and are limited in melt flow rate. In thin-wall injection molding applications the use of such products leads to higher raw material cost and higher conversion cost due to longer cycle time when compared to random polypropylene copolymers.

What is desired is a composition that can be readily injection molded into articles that exhibit a superior balance of stiffness, excellent optics (such as low haze and/or high clarity), and acceptable toughness levels, while also providing for lower raw material cost and lower conversion cost due to competitive cycle times. Additionally, it is desirable for the articles to resist stress whitening when manipulated and handled.

Objects of the Invention

One object of the invention is to provide a composition which can be made into injection molded articles exhibiting an excellent balance of stiffness, toughness and optical properties, such as high clarity and/or low haze.

Another object of the invention is for the injection molded articles to exhibit the above-mentioned properties and, further, exhibit good resistance to stress whitening.

A further object of the invention is to provide a composition containing an impact modifier that is compatible with clarified polypropylenes and therefore can be dry blended in an injection molding machine, and eliminates the need for long mixing times.

SUMMARY

In a first embodiment, the invention is a composition suitable for manufacturing injection molded articles having a minimum wall thickness of from 500 μm to 2.0 mm, the composition comprising:

(A) from 2 to 15% by weight (preferably from 4-10% by weight, more preferably from 5-9% by weight) of a propylene-ethylene copolymer having substantially isotactic propylene sequences, the propylene-ethylene copolymer comprising:
  (1) at least 75% by weight units derived from propylene and from 11 to 18% by weight units derived from ethylene;
  (2) the propylene-ethylene copolymer having a melt flow rate from 4 to 30 grams/10 minutes (preferably from 5-26 grams/10 minutes, more preferably from 6-20 grams/10 minutes); and (B) from 85 to 98% by weight of a random polypropylene copolymer having from 2.5 to 5.0% by weight units derived from ethylene (for best optical/stiffness balance, preferably the random polypropylene copolymer has from 3.0 to 4.0% by weight units derived from ethylene), a melt flow rate of from 25 to 130 grams/10 minutes (for faster manufacture of the injection molded articles, the melt flow rate is preferably from 30 to 60 grams/10 minutes and more preferably from 40 to 50 grams/10 minutes) grams/10 minutes;

(C), from 500 to 2500 ppm by weight of a nucleator/clarifier additive (based on the weight of the random polypropylene copolymer), wherein, the melt flow rate of the composition is from 20 to 125 grams/10 minutes and wherein a 1.6 mm thick section of the injection molded article exhibits:

(1) room temperature (23° C.) Dart Impact strength by ISO 6603 of at least 7.5 J/mm (preferably from 7.5 to 15 J/mm):
(2) tensile-yield strength by ISO 527 of between 20 and 30 MPa;
(3) 0° C. Dart Impact Strength by ISO 6603 of at least 0.43 to 0.75 J/mm (preferably from 0.45 to 0.75 J/mm); and
(3) a value for haze of less than 50%, preferably less than 48% by ASTM 1003.

Any additive, which simultaneously clarifies and nucleates can be used for the Nucleator/clarifier additive. Nucleator/clarifier additives such as ADK NA-11 and ADK NA-21 are commercially available from Asahi Denka Kokai and can be added to the crystalline polypropylene of the invention to improve the stiffness/toughness/clarity balance of the resins. Sorbitols (Sorbitol-type Nucleator/clarifiers) like Millad 3988 available from Milliken & Company or Geniset MD LM-30 available from RIKA International Ltd. are another example of a Nucleator/Clarifier additive useful for the invention. The Nucleator/Clarifier is preferably present within the random polypropylene copolymer at levels of at least 500 ppm and less than 2500 ppm (based on the weight of the random polypropylene copolymer); more preferably the nucleator/clarifier is at levels of at least 800 ppm and less than 2400 ppm; most preferably the nucleator/clarifier is at levels of at least 1200 ppm and less than 2200 ppm. In some applications where low levels of haze are particularly important, the nucleator/clarifier preferably is a sorbital-type Nucleator/clarifier, such as Millad 3988 (1,2,3,4-di-meta, para-methyl-benzylidene sorbitol) or Geniset MD LM-30 (1,3,2,4-Di(methylbenzylidene)Sorbitol), at levels of between 800 and 2500 ppm, preferably between 1200 and 2300 ppm, more preferably between 1700 ppm and 2200 ppm based on the weight of the random polypropylene copolymer utilized. The clarifier also works as a nucleator and allows for short cycle times in the injection molding process.

Preferably, the Nucleator/Clarifier additive is added to the random polypropylene copolymer during the pelletization of the random polypropylene copolymer.

The propylene-ethylene copolymers have a molecular weight distribution (Mw/Mn) of less than 3.5. In one preferred aspect of the invention, the propylene-ethylene copolymers also exhibit a broad crystallinity distribution, as described later in the section detailing the propylene-ethylene copolymers. In an alternative preferred aspect of the invention, the propylene-ethylene copolymer exhibit a narrow crystallinity distribution.

In a second embodiment, the composition further includes a homogeneous ethylene-alpha olefin interpolymer selected from a substantially linear polyethylene and a homogeneously branched linear polyethylene having a molecular weight distribution (Mw/Mn) of less than 3.5, a density from 0.885 to 0.915 g/ml, and a heat of fusion of from 65 to 125 Joules/gram, wherein the weight ratio of the propylene-ethylene copolymer (A) to the homogeneous ethylene-alpha olefin interpolymer is from 97:3 to 80:20. If present, the homogeneous ethylene-alpha olefin interpolymer is pre-blended with propylene-ethylene copolymer prior to being introduced into the extruder of the injection molding machine. More preferably, the homogeneous ethylene-alpha olefin interpolymer is blended with the propylene-ethylene copolymer during the manufacture of the propylene-ethylene copolymer, most preferably prior to the pelletization of the propylene-ethylene copolymer.

In a third embodiment, the invention is a thin-wall injection molded article having a minimum wall thickness of from 500 μm to 2.0 mm which incorporates the composition of the first and/or second embodiment. Examples of thin-wall injection molded articles include, containers for food, crates, boxes, pails, houseware articles, furniture, drinking cups, caps and closures and others, which incorporate the composition.

Preferably, the thin-wall injection molded articles exhibit low stress whitening behavior. Stress whitening behavior is determined as follows. The level of stress whitening is visually assessed in a qualitative manner whereby samples impacted with a dart where grouped in terms of the level of stress whitening exhibited at the area of impact. "Low" was given to samples exhibiting almost no stress whitening, "Mid" to samples exhibiting some degree of whiteness and "High" to samples turning white at the surface of impact.

FIGURES

DETAILED DESCRIPTION

Figure 1:
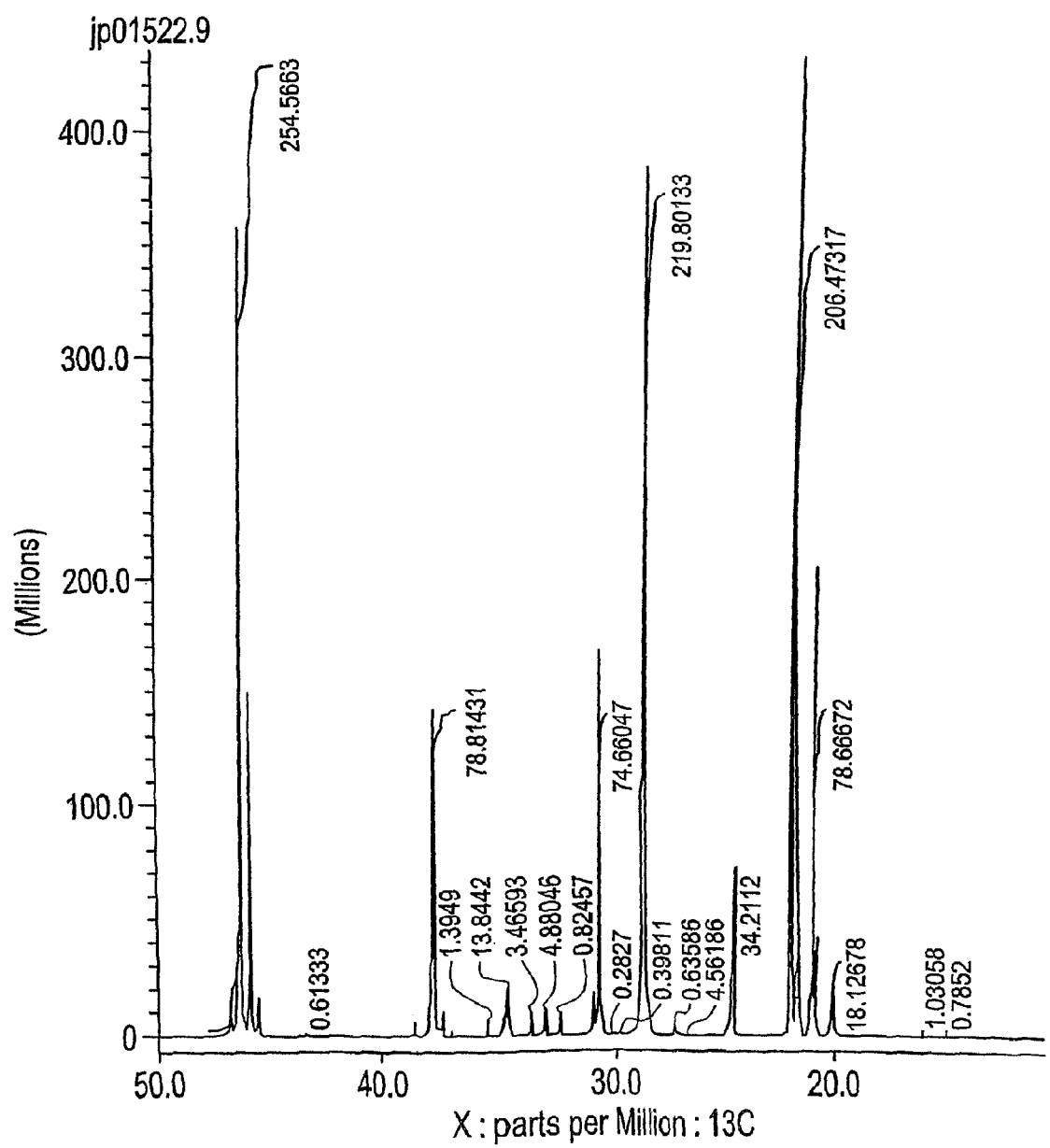
FIG. 1 shows the $^{13}$C NMR Spectrum of a propylene-ethylene copolymer (made with an activated non-metal-locene, metal-centered, heteroaryl ligand catalyst similar to Catalyst A), which is similar to the propylene-ethylene copolymers used in the Examples.

Random Polypropylene Copolymer for the Composition:

The polypropylene used in the composition is a random polypropylene copolymer. The random polypropylene copolymer has at least 94% by weight of units derived from propylene, with 5% by weight or less of units derived from ethylene.

The random polypropylene copolymer comprising from 2.0 to 5.0% by weight units derived from ethylene, preferably from 3.0 to 4.0% by weight units derived from ethylene. The ethylene content is 5.0% by weight or less to meet food contact compliance requirements. The random polypropylene copolymer may be made with generally available catalysts, including Ziegler-Natta and Metallocene catalysts. Preferably, the random polypropylene copolymer is manufactured using a Ziegler-Natta type catalyst system.

The random polypropylene copolymers useful for the invention have a melt flow rate of from 25 to 130 g/10 min, preferably from 30 to 60 g/10 min, and more preferably from 40 to 50 g/10 min.

Preferably enough nucleator/clarifier additive is added to the random polypropylene copolymer to provide 500 to 2500 ppm of the nucleator/clarifier additive based on the weight of the random polypropylene copolymer, preferably from 800 to 2400 ppm, more preferably from 1200 to 2300 ppm based on the weight of the random polypropylene copolymer.

Propylene-Ethylene Copolymer:

The propylene-ethylene copolymer of the current invention is characterized as having substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra. NMR spectra are determined as described below.

The propylene-ethylene copolymers comprise at least 75% by weight units derived from propylene (sometimes referred to as the "propylene content"). The propylene-ethylene copolymer comprise from 11 to 18% by weight units derived from ethylene (sometimes referred to as the "ethylene content"), preferably from 12 to 17% by weight units derived from ethylene, more preferably from 13 to 16% by weight units derived from ethylene.

The propylene-ethylene copolymers typically exhibit a heat of fusion of: from 2.5 Joules/gram to 36 Joules/gram; preferably, from 7.5 Joules/gram to 31 Joules/gram; more preferably from 12 Joules/gram to 26 Joules/gram; most preferably from 12 Joules/gram to 20 Joules/gram.

The propylene-ethylene copolymers of the invention may contain units derived from other alpha-olefins, in addition to units derived from propylene and ethylene.

$^{13}$C NMR spectroscopy is one of a number of techniques known in the art of measuring comonomer incorporation into a polymer and measuring isotactic triad levels in propylene-based copolymers, such as the current propylene-ethylene copolymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^1$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm.

For propylene-ethylene copolymers, the following procedure is used to calculate the mole percent ethylene in the polymer. Integral regions are determined as follows:

TABLE A

Integral Regions for Determining % Ethylene

| Region designation | PPM |
|---|---|
| A | 44-49 |
| B | 36-39 |
| C | 32.8-34 |
| P | 31.0-30.8 |
| Q | Peak at 30.4 |
| R | Peak at 30 |
| F | 28.0-29.7 |
| G | 26-28.3 |
| H | 24-26 |
| I | 19-23 |

Region D is calculated as D=P×(G×Q)/2. Region E=R+Q+(G×Q)/2.

TABLE B

| Calculation of Region D |
|---|
| PPP = (F + A − 0.5 D)/2 |
| PPE = D |
| EPE = C |
| EEE = (E − 0.5 G)/2 |
| PEE = G |
| PEP = H |
| Moles P = sum P centered triads |
| Moles E = sum E centered triads |
| Moles P = (B + 2A)/2 |
| Moles E = (E + G + 0.5B + H)/2 |

C2 values are calculated as the average of the two methods above (triad summation and algebraic) although the two do not usually vary. The weight percent of units derived from ethylene in the propylene-ethylene copolymers can be calculated from the values for mole percent ethylene by one of ordinary skill in the art.

In one preferred aspect of the invention, the propylene-ethylene copolymer utilized in the invention comprises a propylene-ethylene copolymer made using a non-metallocene, metal-centered, heteroaryl ligand catalyst as described in U.S. patent application Ser. No. 10/139,786 filed May 5, 2002, which is incorporated by reference herein in its entirety for its teachings regarding such catalysts. For such catalysts, the term "heteroaryl" includes substituted heteroaryl. An example of such a non-metallocene, metal-centered, heteroaryl ligand catalyst is Catalyst A described in the Examples. The propylene-ethylene copolymers made with such non-metallocene, metal-centered, heteroaryl ligand catalyst exhibit a unique regio-error. The regio-error is identified by $^{13}$C NMR peaks corresponding at about 14.6 and about 15.7 ppm, which are believed to be the result of stereo-selective 2,1-insertion errors of propylene units into the growing polymer chain. In this particularly preferred aspect, these peaks are of about equal intensity.

Figure 2:
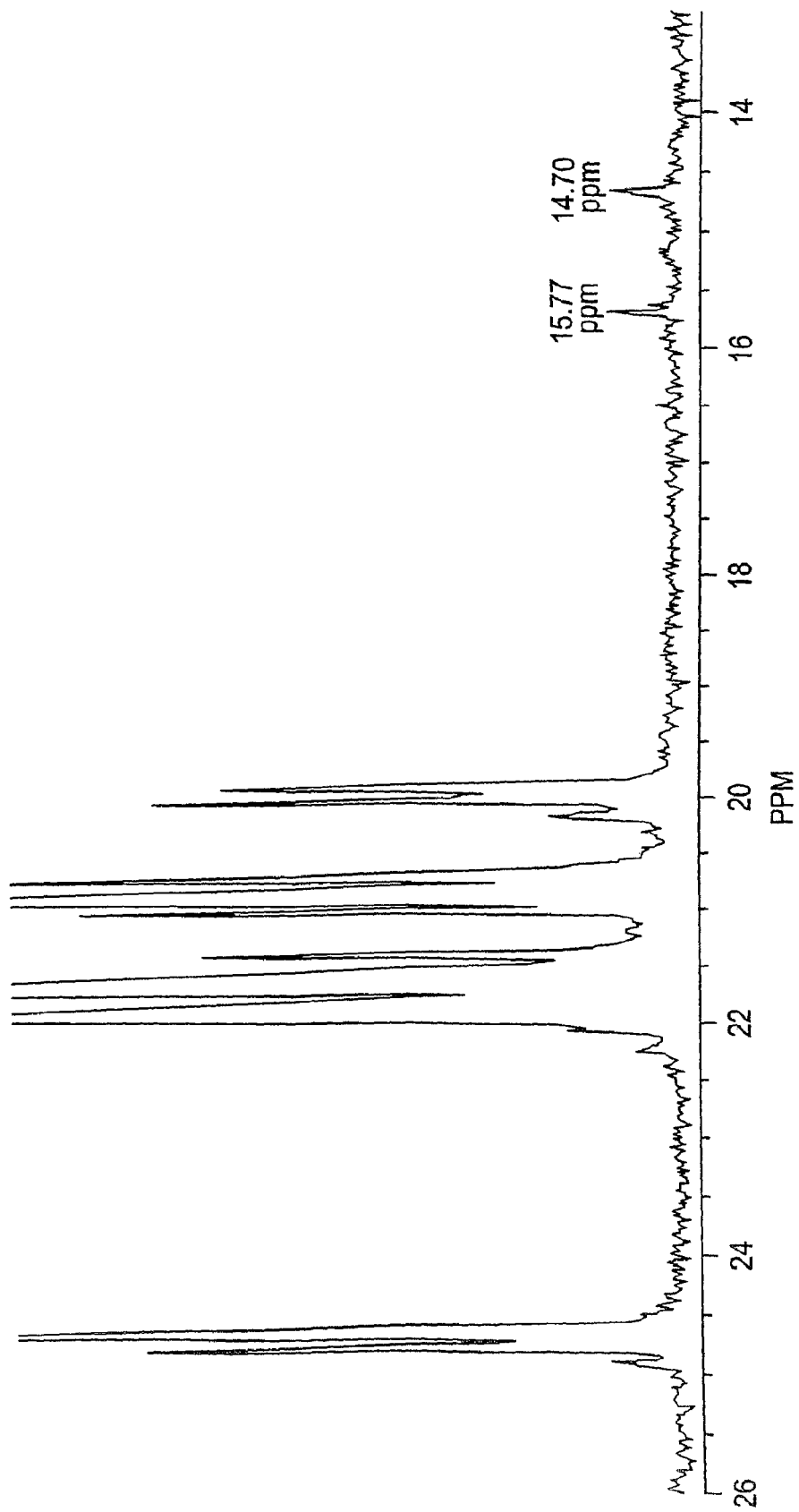
FIG. 2 shows the $^{13}$C NMR Spectrum of same propylene-ethylene copolymer as FIG. 1. However, the spectrum is shown with an expanded Y-axis scale relative to FIG. 1, in order to more clearly show the regio-error peaks at about 14.6 and 15.7 ppm.
Figure 3:
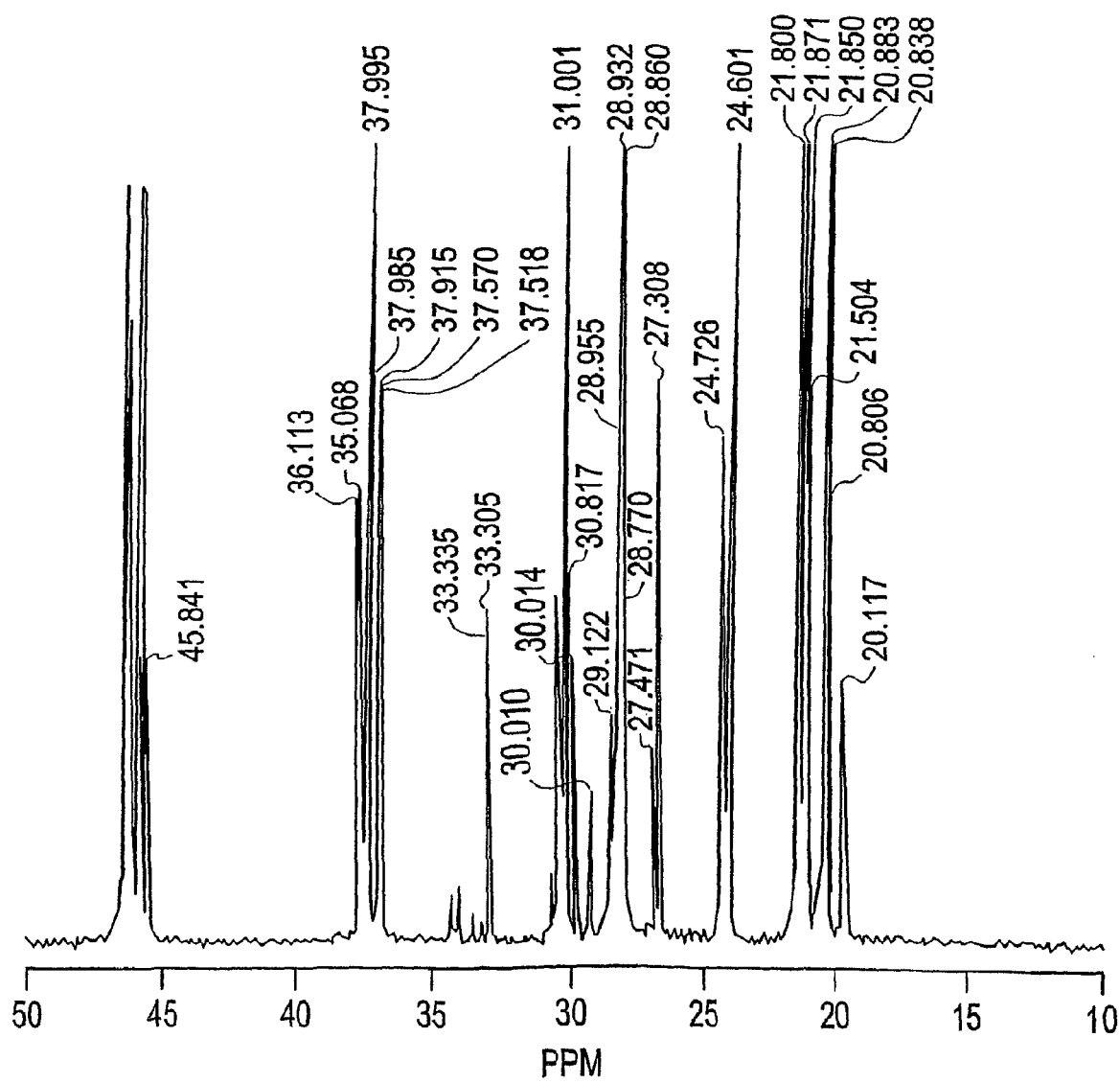
FIG. 3 shows the $^{13}$C NMR Spectrum of a propylene-ethylene copolymer prepared using a metallocene catalyst. The figure demonstrates the absence of regio-error peaks in the region around 15 ppm for a propylene-ethylene copolymer made with a metallocene catalyst.

A comparison of several $^{13}$C NMR spectra further illustrates the unique regio-errors of propylene-ethylene copolymers preferably utilized in the particularly preferred aspect of the invention. FIGS. 1 and 2 are the spectra of the propylene-ethylene copolymers similar to the propylene-ethylene copolymers utilized in the Examples. The spectrum of each polymer reports a high degree of isotacticity (isotactic triad (mm) measured by $^{13}$C NMR of greater than 0.94) and the unique regio-errors of these propylene-ethylene based copolymers. The $^{13}$C NMR spectrum of FIG. 3 is that of a propylene-ethylene copolymer prepared using a metallocene catalyst. This spectrum does not report the regio-error (around 15 ppm).

Isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For propylene-ethylene copolymers the mr region is corrected by subtracting 37.5-39 ppm integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art.

Broad Crystallinity Distribution

In another particularly preferred aspect of the invention, the propylene-ethylene copolymers exhibit broad crystallinity distribution. The inventors believe that the use of a propylene-ethylene copolymer having a broad crystallinity distribution will result in compositions having better (i.e. higher values of) toughness.

For propylene-ethylene copolymers having a heat of fusion greater than 20 Joules/gram, the crystallinity distribution preferably is determined from TREF/ATREF analysis as described below.

The determination of crystallizable sequence length distribution can be accomplished on a preparative scale by temperature-rising elution fractionation (TREF). The relative mass of individual fractions can be used as a basis for estimating a more continuous distribution. L. Wild, et al., *Journal of Polymer Science. Polymer. Physics Ed.*, 20, 441 (1982), scaled down the sample size and added a mass detector to produce a continuous representation of the distribution as a function of elution temperature. This scaled down version, analytical temperature-rising elution fractionation (ATREF), is not concerned with the actual isolation of fractions, but with more accurately determining the weight distribution of fractions.

While TREF was originally applied to copolymers of ethylene and higher α-olefins, it can also be used for the analysis of copolymers of propylene with ethylene (or higher α-olefins). The analysis of copolymers of propylene requires higher temperatures for the dissolution and crystallization of pure, isotactic polypropylene, but most of the copolymerization products of interest elute at similar temperatures as observed for copolymers of ethylene. The following table is a summary of conditions used for the analysis of copolymers of propylene. Except as noted the conditions for TREF are consistent with those of Wild, et al., ibid, and Hazlitt, *Journal of Applied Polymer Science: Appl. Polym. Symp.*, 45, 25 (1990).

TABLE C

Parameters Used for TREF

| Parameter | Explanation |
|---|---|
| Column type and size | Stainless steel shot with 1.5 cc interstitial volume |
| Mass detector | Single beam infrared detector at 2920 cm$^{-1}$ |
| Injection temperature | 150° C. |
| Temperature control device | GC oven |
| Solvent | 1,2,4-trichlorobenzene |
| Concentration | 0.1 to 0.3% (weight/weight) |
| Cooling Rate 1 | 140° C. to 120° C. @ −6.0° C./min. |
| Cooling Rate 2 | 120° C. to 44.5° C. @ −0.1° C./min. |
| Cooling Rate 3 | 44.5° C. to 20° C. @ −0.3° C./min. |
| Heating Rate | 20° C. to 140° C. @ 1.8° C./min. |
| Data acquisition rate | 12/min. |

The data obtained from TREF are expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature.

One statistical factor that can be used to describe the crystallinity distribution of a propylene-ethylene copolymer is the skewness, which is a statistic that reflects the assymetry of the TREF curve for a particular polymer. Equation 1 mathematically represents the skewness index, $S_{ix}$, as a measure of this asymmetry.

$$S_{ix} = \frac{\sqrt[3]{\sum w_i * (T_i - T_{Max})^3}}{\sqrt{\sum w_i * (T_i - T_{Max})^2}}.$$

Equation 1

The value, $T_{Max}$, is defined as the temperature of the largest weight fraction eluting between 50 and 90° C. in the TREF curve. $T_i$ and $w_i$ are the elution temperature and weight fraction respectively of an arbitrary, $i^{th}$ fraction in the TREF distribution. The distributions have been normalized (the sum of the $w_i$ equals 100%) with respect to the total area of the curve eluting above 30° C. Thus, the index reflects only the shape of the crystallized polymer and any uncrystallized polymer (polymer still in solution at or below 30° C.) has been omitted from the calculation shown in Equation 1. In a particularly preferred aspect of the current invention, the skewness index for the propylene-ethylene copolymer is greater than (−1.2), preferably greater than −1.0, more preferably greater than −0.8, and further more preferably greater than −0.7, and in some instances greater than −0.60. Such a skewness index is indicative of a propylene-ethylene copolymer having a broad crystallinity distribution.

In addition to the skewness index, another measure of the breadth of the TREF curve (and therefore a measure of the breadth of the crystallinity distribution of a copolymer is the Median Elution Temperature of the final eluting quartile ($T_{M4}$). The Median Elution Temperature is the median elution temperature of the 25% weight fraction of the TREF distribution (the polymer still in solution at or below 30° C. is excluded from the calculation as discussed above for skewness index) that elutes last or at the highest temperatures. The Upper Temperature Quartile Range ($T_{M4}$-$T_{Max}$) defines the difference between the Median Elution Temperature of the final eluting quartile and the peak temperature $T_{Max}$. In this particularly preferred aspect of the invention, the propylene-alpha olefin copolymers have broad crystallinity distributions indicated in part by an Upper Temperature Quartile Range of greater than 4.0° C., preferably at least 4.5° C., more preferably at least 5° C., further more preferably at least 6° C., most preferably at least 7° C., and in some instances, at least 8° C. and even at least 9° C. In general, the higher the value for the Upper Temperature Quartile Range, the broader the crystallinity distribution of the copolymer.

Further, in this particularly preferred aspect, propylene-ethylene copolymers show unusual and unexpected results when examined by TREF. The distributions tend to cover a large elution temperature range while at the same time giving a prominent, narrow peak. In addition, over a wide range of ethylene incorporation, the peak temperature, $T_{Max}$, is near 60° C. to 65° C. In conventional propylene-ethylene copolymers, for similar levels of ethylene incorporation, this peak moves to higher elution temperatures with lower ethylene incorporation.

For conventional metallocene catalysts the approximate relationship of the mole fraction of propylene, $X_p$, to the TREF elution temperature for the peak maximum, $T_{Max}$, is given by the following equation:

$$\text{Log}_e(X_p) = -289/(273 + T_{max}) + 0.74$$

For the propylene-ethylene copolymers in this particularly preferred aspect, the natural log of the mole fraction of propylene, LnP, is greater than that of the conventional metallocenes, as shown in this equation:

$$LnP > -289/(273 + T_{max}) + 0.75$$

For propylene-alpha olefin copolymers exhibiting a heat of fusion of less than 20 Joules/gram heat of fusion, broad crystallinity distribution preferably is indicated by either the determination of the high crystalline fraction (HCF) using DSC or by the determination of the relative composition drift (RCD) using GPC-FTIR. These analyses are performed as follows:

The High Crystalline Fraction, HCF, is defined as the partial area in the DSC melting curve for the propylene-alpha olefin copolymer above 128° C. The partial area is obtained by first obtaining the heat of fusion, then dropping a vertical line at 128° C. and obtaining the partial area above 128° C. (relative to the same baseline as was used for the heat of fusion). The propylene-ethylene copolymers utilized in a particularly preferred aspect of the current invention have a heat of fusion of less than 20 Joules/gram and have a HCF fraction of greater than about 0.1 J/g and an ethylene content of greater than about 11% by weight, more preferably the HCF will be greater than 0.2 J/g, and most preferably the HCF will be greater than about 0.5 J/g and also have an ethylene content of greater than about 11% by weight.

Figure 4:
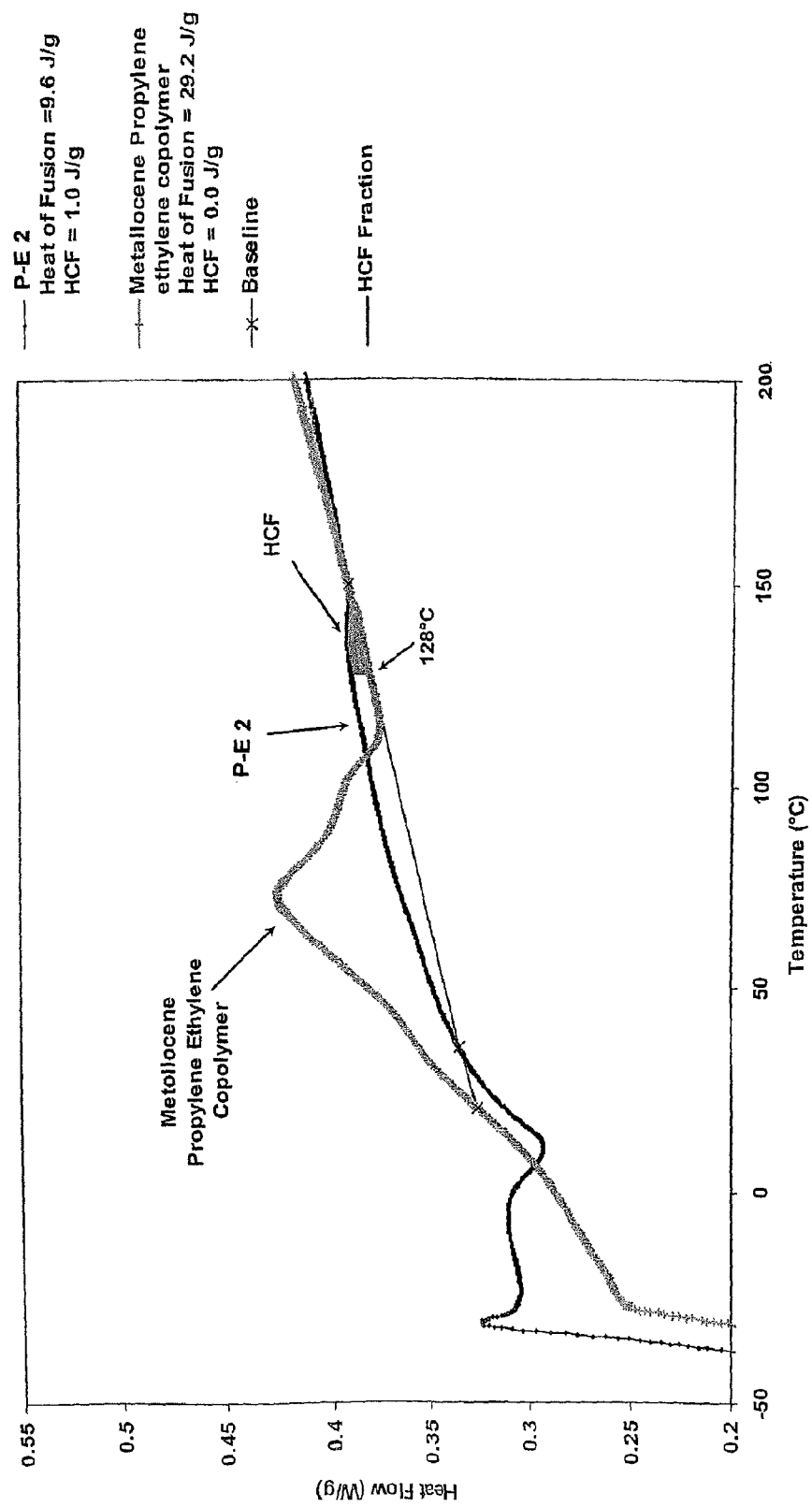
FIG. 4 shows a DSC trace for two propylene-ethylene copolymers.

FIG. 4 shows a comparison of broad and narrow crystallinity distributions by DSC for a propylene-ethylene copolymer (P-E 2) similar to the propylene-ethylene copolymer of P/E-1 of the Examples, except it has a melt flow rate of 12 gram/10 min, a content of units derived from ethylene of 15 percent by weight, a heat of fusion of about 9.6 J/g, and a MWD of 2.46, and a metallocene catalyzed propylene-ethylene copolymer having about 13.7 weight percent units derived from ethylene and a melt flow rate of approximately 150 g/10 minutes. The figure also shows the high crystalline fraction (HCF) partial area relative to the area representing the heat of fusion.

As an alternative or adjunct to the DSC method described above, the relative breadth of the crystallinity distribution for lower crystallinity copolymers can be established using GPC-FTIR methodologies [such as, R. P. Markovich, L. G. Hazlitt, L. Smith, *ACS Symposium Series: Chromatography of Polymers*, v. 521, pp. 270-276, 199; R. P. Markovich, L. G. Hazlitt, L. Smith, *Polymeric Materials Science and Engineering*, 65, 98-100, 1991; P. J. DesLauriers, D. C. Rohlfing, E. T. Hsieh, "Quantifying Short Chain Branching in Ethylene 1-olefin Copolymers using Size Exclusion Chromatography and Fourier Transform Infrared Spectroscopy (SEC-FTIR)", *Polymer*, 43 (2002), 159-170]. These methods, originally intended for ethylene based copolymers, can be readily adapted to the propylene based systems to provide copolymer composition as a function of polymer molecular weight. The propylene-ethylene copolymers exhibiting broad composition (with respect to ethylene incorporation) distributions, when measured as described in the following GPC-FTIR method, have also been found to exhibit broad crystallinity distributions as indicated by high HCF values in the above described DSC method. For this reason, for the purposes of the current invention, composition distribution and crystallinity distribution shall be regarded as congruent, in that the relative breadth of the crystallinity distribution as indicated by the magnitude of the HCF value for a low overall crystallinity copolymer (i.e. heat of fusion less than 20 Joules/gram) corresponds to a broader composition distribution as indicated by the magnitude of RCD (to be described below) measured by GPC-FTIR.

Figure 5:
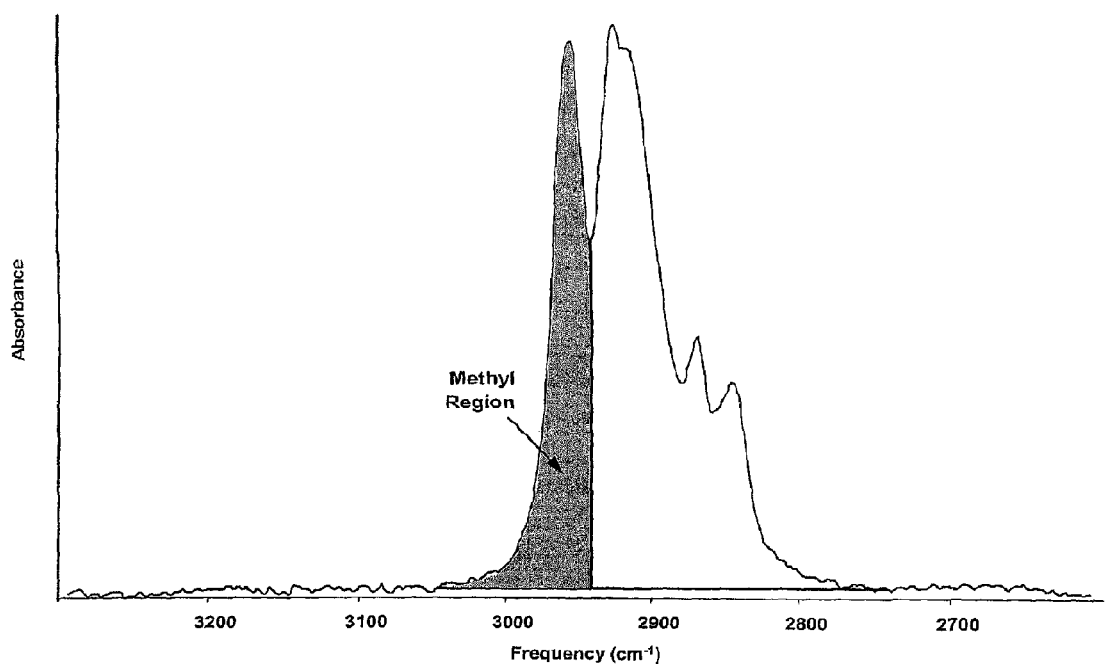
FIG. 5 shows an example infrared spectrum for a propylene-ethylene copolymer.

The various specifications and parameters for the GPC-FTIR analysis are given in Tables D and E. Sequential spectra are obtained from the GPC-FTIR system while dissolved copolymer fractions elute from the GPC column (in order of decreasing molecular weight) through an appropriately designed flow through cell [Part # 0820-2000, Polymer Laboratories Inc., Amherst, Mass.]. An absorbance region from 2750 cm$^{-1}$ to 3050 cm$^{-1}$ within each FTIR spectrum is integrated as shown in FIG. 5 and recorded as a function of the spectrum number or elution volume and is used as a very good approximation of the mass (or concentration) at each spectrum number or elution volume in the GPC chromatogram. This integrated area is referred to as the total absorbance of the spectrum and is further normalized by dividing by the sum of all the other total area integrations for all the other spectra. This normalized total area is thus equal to the weight fraction of the total polymer represented by a given spectrum (at a specific elution volume). Therefore the weight fraction of eluted polymer is the Gaussian shaped curve in each of the FIGS. 7-8 which is derived from the normalized total areas of each spectrum. The propylene/ethylene composition in each set of sequential spectrum (or at each successive elution volume) is estimated using the partial area of the absorbances in the spectrum occurring at greater than 2940 cm$^{-1}$ as shown in FIG. 5 using a calibration curve (as for example in FIG. 6). The calibration is prepared by integrating the averaged eluted spectra for several copolymers whose composition was previously determined by NMR using the methods found herein. Thus the composition (ethylene weight fraction) can be determined for each spectrum and plotted as a function of spectrum number or elution volume. These distributions are depicted in FIG. 7-8.

Figure 7:
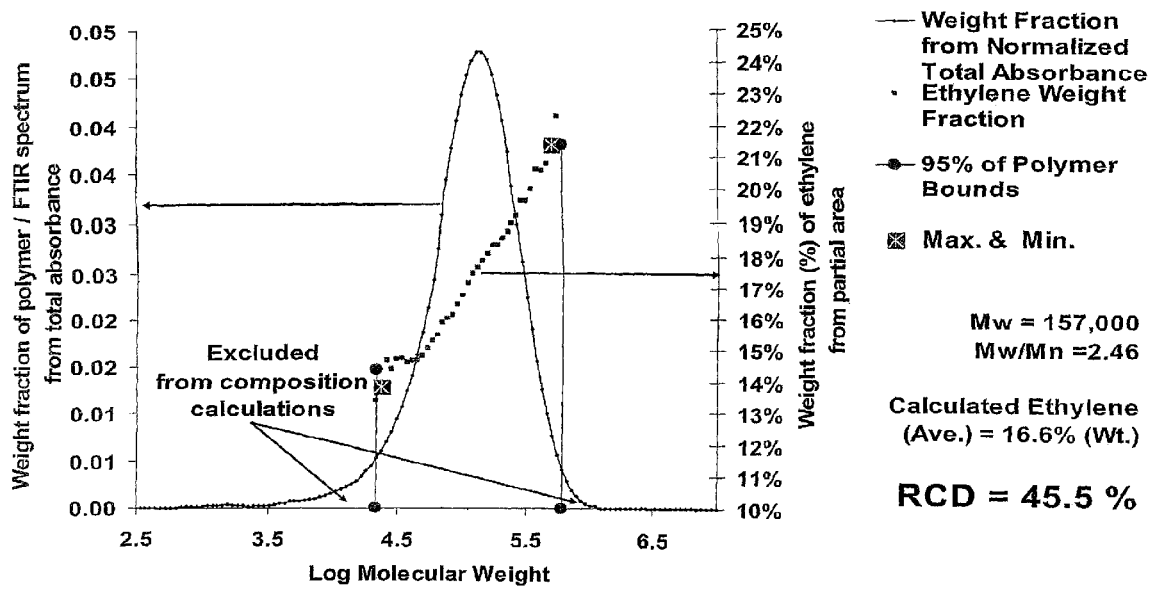
FIG. 7 shows the composition distribution by GPC-FTIR for the propylene-ethylene copolymer (P-E 2) of FIG. 4.
Figure 8:
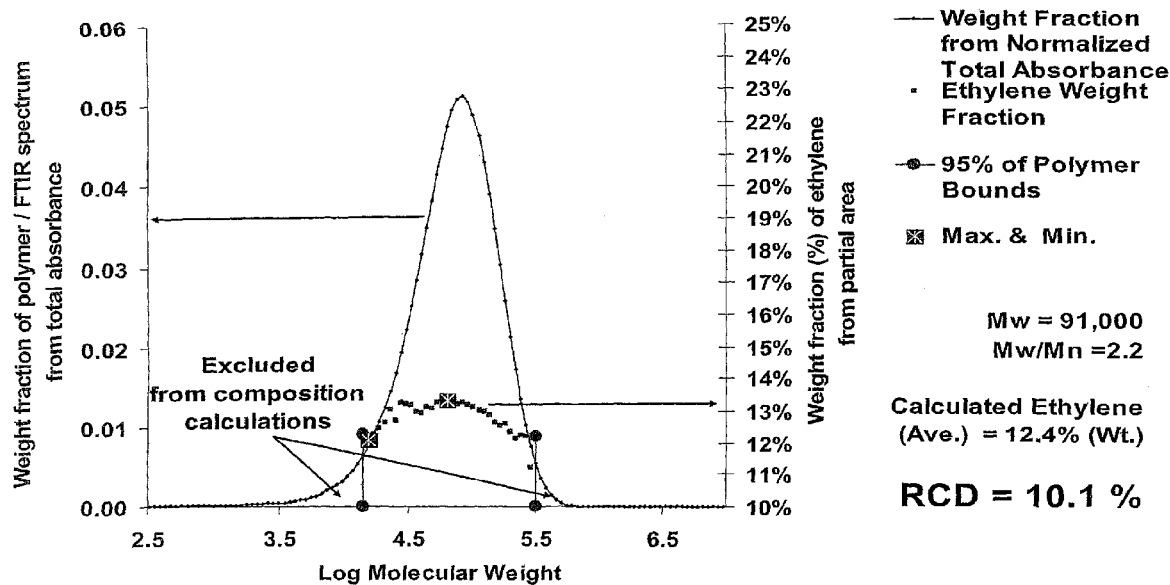
FIG. 8 shows the composition distribution by GPC-FTIR for a metallocene propylene ethylene copolymer having 13.7 percent by weight units derived from ethylene (as calculated by the NMR method described earlier).

Finally, the breadth of any particular GPC-FTIR composition distribution (and by the definition described above, the relative crystallinity distribution) can be estimated by comparing the maximum and minimum ethylene content (of the fractions) using only the spectra with the highest total absorbance (i.e the highest polymer concentration) that when summed give 95% (by weight) of the eluted polymer and ignoring the spectra with the lowest total absorbance (or the "wings" in the GPC curve as shown in FIGS. 7 and 8). This is necessary to avoid problems arising from low signal to noise. The maximum and minimum values are chosen as the median value of the three highest and lowest calculated ethylene values, respectively, among the 95% (by weight) of spectra for which compositions are calculated. The difference between the maximum and the minimum ethylene composition divided by the averaged calculated whole polymer ethylene composition is defined as the relative compositional drift or RCD and is expressed as a percentage. If the eluting species having the highest ethylene content occur at a higher molecular weight (i.e. at earlier elution volumes) than the species having the lowest ethylene content, then the RCD value is positive, otherwise it is negative Propylene-ethylene copolymers utilized in particularly preferred aspect of the invention exhibit a broad crystallinity distribution as defined by a RCD greater than about 15%, more preferably greater than 30%, and most preferably greater than 45%. Further, in the most preferred aspect the values of RCD exhibited by these propylene-ethylene copolymers are positive. In this particularly preferred aspect, the propylene-alpha olefin copolymers exhibit both a broad crystallinity distribution and also, on average, have polymer chains which have higher ethylene incorporation and higher molecular weight relative to the polymeric chains incorporating lower amounts of ethylene.

Molecular weights are calculated from the reported weight average molecular weight, Mw, and the reported number average molecular weight, Mn, for each polymer. These are obtained from analyses described elsewhere in this document. Each sequential spectrum number (or elution volume) can be converted to a molecular weight by solving the following simultaneous equations.

$$M_w = \sum_{s=0}^{N} w_s \cdot M_S$$

$$M_n = \left[\sum_{s=0}^{N} w_s / M_S\right]^{-1}$$

$$\mathrm{Log\_}M_s = m \cdot S + b$$

In these equations, S is the spectrum number (which is analogous to the elution volume) for each of the N+1 ($0 \leq S \leq N$) sequential FTIR spectra, $M_S$ is the molecular weight at the spectrum number, S, $w_S$ is the normalized total area for the spectrum, S, and m and b are the necessary coefficients to calculate the molecular weight at each spectrum, S. These equations are easily solvable using tools such as SOLVER* [Microsoft Corp., Redmond, Wash.], by, for example, minimizing the following function for a and b:

$$f(a, b) = \left[1 - \frac{\mathrm{Mw}}{M_w}\right]^2 + \left[1 - \frac{\mathrm{Mn}}{M_n}\right]^2$$

$$= \left[1 - \frac{\mathrm{Mw}}{\sum_{s=0}^{N} w_s \cdot M_S}\right]^2 + \left[1 - \mathrm{Mn} \cdot \sum_{s=0}^{N} w_s / M_S\right]^2$$

TABLE D

Summary of FTIR [Thermo Electron Corp., Waltham, MA] parameters

DATA COLLECTION INFORMATION

Number of sample scans: 32
Sampling interval: 9.32 sec
Resolution: 4.000
Levels of zero filling: 0
Number of scan points: 8480
Number of FFT points: 8192
Laser frequency: 15798.3 cm − 1
Interferogram peak position: 4096
Apodization: Happ-Genzel
Number of background scans: 0
Background gain: 0.0
DATA DESCRIPTION Number of points: 1738
X-axis: Wavenumbers (cm − 1)
Y-axis: Single Beam
First X value: 649.9036
Last X value: 3999.7031
Data spacing: 1.928497

TABLE D-continued

Summary of FTIR [Thermo Electron Corp., Waltham, MA] parameters

SPECTROMETER DESCRIPTION

Spectrometer: Magna System 560
Source: IR
Detector: MCT/A
Beamsplitter: KBr
Sample spacing: 2.0000
Digitizer bits: 20
Mirror velocity: 3.1647
Aperture: 95.00
Sample gain: 1.0
High pass filter: 200.0000
Low pass filter: 20000.0000
DATA PROCESSING HISTORY Data collection type: GC/IR
Total collection time: 30.01
Final format: Single Beam
Resolution: 4.000
from 649.9036 to 3999.7031
SERIES DESCRIPTION Minimum value: 0.1553
Maximum value: 30.0080
Step size: 0.1555
Number of spectra: 193

TABLE E

Summary of Flow through cell [Polymer Laboratories Inc., Amherst, MA.] and GPC[Waters Corp., Milford, MA.] parameters
Polymer Labs FTIR Interface (Part # 0820-2000) with liquid connections on top Cell Windows: Calcium fluoride (Dead volume: 70 μL, Path length: 1 millimeter)
GPC Instrument: Waters150 C. High Temperature GPC
Columns: 4 × 300 × 7.5 millimeter Polymer Labs 10 micron Mixed B
Solvent: Perchloroethylene (Sigma-Aldrich HPLC grade)
Flow Rate: 1 mL/min.
Concentration: 2.5 mg/mL
Injection: 250 μL
Temperatures: 110° C.

FIG. 5 shows an example infrared spectrum for a propylene-ethylene copolymer. The spectrum is from a GPC-FTIR system and shows the carbon-hydrogen stretching regions. The absorbances at frequencies greater than 2940 cm$^{-1}$ are calculated as a fraction of the total absorbance from 2750 cm$^{-1}$ to 3050 cm$^{-1}$ and used to calculate the weight fraction of propylene.

Figure 6:
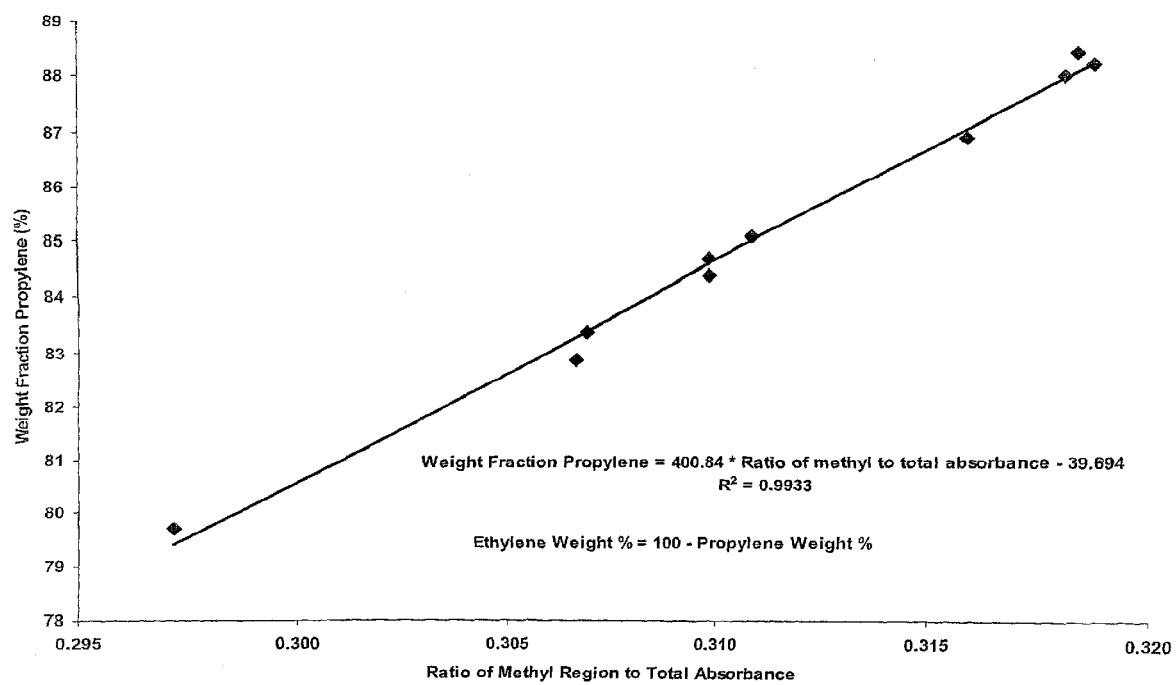
FIG. 6 shows the calibration used to calculate the propylene weight fraction using the total area and a partial area from the absorbances at frequencies greater than 2940 cm$^{-1}$ in an infrared spectrum such as in FIG. 5.

FIG. 6 shows the calibration used to calculate the propylene weight fraction using the total area and a partial area from the absorbances at frequencies greater than 2940 cm$^{-1}$ in an infrared spectrum such as in FIG. 5.

FIG. 7 shows the composition distribution by GPC-FTIR for the propylene-ethylene copolymer (P-E 2) of FIG. 4. The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

FIG. 8 shows the composition distribution by GPC-FTIR for a metallocene propylene ethylene copolymer having 13.7 percent by weight units derived from ethylene (as calculated by the NMR method described earlier). The key data represented are the total normalized absorbance at each spectrum (elution volume), the ethylene weight fraction for each spectrum (elution volume), and the relative composition drift ("RCD") for the composition distribution. Compositions are only calculated for 95% (by weight) of the spectra representing the highest concentrations of the polymer to avoid errors caused by low signal to noise.

Molecular Weight and Molecular Weight Distribution

The propylene-based copolymer has a molecular weight distribution (MWD), defined as weight average molecular weight divided by number average molecular weight (Mw/Mn) of 3.5 or less.

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS 1 ranging from 580-7,500,000 g/mole) in conjunction with their elution volumes. The equivalent propylene-ethylene copolymer molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\}=KM^a$$

where $K_{pp}=1.90E-04$, $a_{pp}=0.725$ and $K_{ps}=1.26E-04$, $a_{ps}=0.702$.

Differential Scanning Calorimetry

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of Polymeric Materials*, Academic Press, 1981). In the particularly preferred aspect of the invention, propylene-ethylene copolymers are utilized in the invention and are characterized by a DSC curve with a $T_{me}$ that remains essentially the same (at or above 128° C., preferably above 140° C.) and a $T_{max}$ that decreases as the amount of unsaturated comonomer in the copolymer is increased. $T_{me}$ means the temperature at which the melting ends and $T_{max}$ means the peak melting temperature, both as determined by one of ordinary skill in the art from DSC analysis using data from the final heating step.

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The propylene-based copolymers samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and then heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 101 C/min until complete melting.

The output data from the DSC consists of time (sec), temperature (° C.), and heat flow (watts). Subsequent steps in the analysis of melting endotherms are as follows. First, the heat flow is divided by the sample mass to give specific heat flow (units: W/g). Second, a baseline is constructed and subtracted from the specific heat flow to give baseline-subtracted heat flow. For the analyses presented here, a straight-line baseline is used. The lower temperature limit for the baseline is chosen as a point on the high temperature side of the glass transition. The upper temperature limit for the baseline is chosen as a temperature about 5-10° C. above the completion of the melting endotherm. Although a straight-line baseline is theoretically not exact, it offers greater ease and consistency of analysis, and the error introduced is relatively minor for samples with specific heats of melting of about 15-20 Joules per gram or higher. Employing a straight-line baseline in lieu of a more theoretically correct baseline does not substantially affect any of the results or conclusions presented below, although the fine details of the results would be expected to change with a different prescription of the instrumental baseline.

The resulting enthalpy curves are analyzed for peak melting temperature (which is the temperature at which the baseline-subtracted heat flow is a maximum (here the convention is that heat flow into the sample is positive)), onset and peak crystallization temperatures, heat of fusion and heat of crystallization, $T_{me}$, and any other DSC analyses of interest. The factor that is used to convert heat of fusion into nominal weight % crystallinity is 165 J/g=100 weight % crystallinity. With this conversion factor, the total crystallinity of a propylene-based copolymer (units: weight % crystallinity) is calculated as 100% times heat of fusion divided by 165 J/g.

Melt flow rate (MFR) measurement is performed according to ASTM D-1238, Condition 230° C./2.16 kilogram (kg) weight. As with the melt index, the melt flow rate is inversely proportional to the molecular weight of the polymer. Thus, the higher the molecular weight, the lower the melt flow rate, although the relationship is not linear.

Optional Homogeneous Ethylene-Alpha Olefin Interpolymer:

The homogeneous ethylene-alpha olefin interpolymer used in the blend preferably is an interpolymer of units derived from ethylene and a C4-C20 alpha-olefin comonomer. The preferred alpha-olefin comonomers are C4 to C12 alpha-olefins, more preferably C4-C8 alpha-olefins and 4-methyl-1-pentene, further more preferably C4, C6 and C8 alpha-olefins, and most preferably 1-octene. The homogeneous ethylene-alpha olefin interpolymer comprises from 91 to 97 mole percent units derived from ethylene with the remainder comprising an alpha olefin. The homogeneous ethylene-alpha olefin interpolymers are selected from substantially linear polyethylene polymers and homogeneous branched linear polyethylene (both as more fully described below). The homogeneous ethylene-alpha olefin interpolymers can be made using manufacturing processes known to one of ordinary skill in the art, such as gas phase, solution, or slurry polymer manufacturing processes. Examples of homogeneous ethylene-alpha olefin interpolymers useful in the invention are ethylene/1-octene substantially linear polyethylene available from The Dow Chemical Company under the trademark "AFFINITY" and "ENGAGE", homogeneous branched linear polyethylene available from ExxonMobil Chemical and DEXPlastomers (DSM/ExxonMobil Chemical) under the trademarks "EXACT" and "EXCEED" and ethylene-alpha-olefin interpolymers available from Innovene (subsidiary of BP Group under the trademark "INNOVEX", ethylene-alpha olefin copolymers available from Basell under the trademarks "LUPOLEX" and "LUFLEXEN", and ethylene-alpha olefin copolymers available from Mitsui Chemicals under the trademarks "TAFMER".

A polyethylene is any polymer comprising greater than seventy mole percent—$CH_2CH_2$— repeating units derived from an ethylene monomer. Interpolymers include copolymers, terpolymers, tetrapolymers and higher order polymers of ethylene and C4 to C20 olefins.

"Substantially linear polyethylene" is polyethylene as described in U.S. Pat. Nos. 5,272,236 and 5,278,272.

"Homogeneously branched linear polyethylenes" are polyethylenes having a CDBI greater than 50% as calculated in accordance with WO1993004486(A1) using the equipment and procedures as described in U.S. Pat. No. 5,008,204, such as polyethylenes available from the Exxon Chemical Company under the trademark "EXCEED" and "EXACT".

The melt index ("MI") of the homogeneous ethylene-alpha olefin interpolymer is from 0.1 to 1500 g/10 min, more preferably from 0.3 to 20 g/10 min, further more preferably from 0.5 to 15 g/10 min, most preferably from 1 to 10 g/10 min. Melt index (MI) measurement is performed according to ASTM D-1238, Condition 190° C./2.16 kilogram (kg) weight, formerly known as "Condition E" and also known as MI or $I_2$. Melt index is inversely proportional to the molecular weight of the polymer.

The density of the homogeneous ethylene-alpha olefin interpolymers are from 0.885 to 0.915 g/mL, preferably from 0.890 to 0.910 g/mL, more preferably from 0.895 to 0.905 g/mL, and most preferably from 0.897 to 0.903 g/mL (measured on compression molded samples at 190° C. according to ASTM D4703-00 and cooled using procedure B).

The homogeneous ethylene-alpha olefin interpolymers exhibit a heat of fusion of from 65 to 125 Joules/gram, preferably from 75 to 115 Joules/gram, more preferably from 80 to 105 Joules/gram, and most preferably from 89 to 101 Joules/gram.

The homogeneous ethylene-alpha olefin interpolymers exhibit a peak crystallization temperature of 64° C. to 94° C., preferably from 69° C. to 90° C., more preferably from 75° C. to 83° C., and most preferably from 76° C. to 82° C. The homogeneous ethylene-alpha olefin interpolymers exhibit a peak melting temperature of 78° C. to 110° C., preferably from 84° C. to 105° C., more preferably from 90° C. to 101° C., and most preferably from 92° C. to 99° C.

The homogeneous ethylene-alpha olefin interpolymer exhibits a flexural modulus (2% secant, by ASTM D790) for compression molded samples using the previously described condition of about 27 to 131 MPa; preferably about 35 to 101 MPa; more preferably about 45 to 78 MPa and most preferably about 51 to 70 MPa.

Preferably, the homogeneous ethylene-alpha olefin interpolymer has an in index of refraction measured by ASTM D542-00 of 1.496 to 1.516, more preferably from 1.503 to 1.509, and most preferably from 1.505 to 1.507. While not wanting to be limited by theory, it is believed that limiting the index of refraction of the ethylene-alpha olefin interpolymer to these ranges will be particularly beneficial for improving the optical properties when incorporated into the inventive composition, which includes the random polypropylene copolymer.

The homogeneous ethylene-alpha olefin interpolymers are present at a level of at least 3 weight percent based on the weight of the propylene-ethylene copolymer and the homogeneous ethylene-alpha olefin interpolymer present in the composition, more preferred at least 5 weight percent; and less than 25 weight percent, preferably less than 18 weight percent based on the overall propylene-ethylene copolymer and the homogeneous ethylene-alpha olefin interpolymer present in the composition.

The maximum amount of homogeneous ethylene-alpha olefin interpolymer to be utilized is limited by the need for compatibility amongst the random polypropylene copolymer, the propylene-ethylene copolymer and the homogeneous ethylene-alpha olefin interpolymer. Additionally, too much homogeneous ethylene-alpha olefin interpolymer can lead to increased stress whitening.

Injection Molded Articles (Less than 2.0 MM):

The articles made from the composition may be used for a wide range of applications. They will be particularly useful for rigid containers for storage of food or other liquid or solid goods. The injection molded articles will exhibit an excellent balance of stiffness (tensile-yield strength of from 20 to 30 MPa as measured by ISO 527), toughness (Dart Impact Strength of at least 7.5 J/mm measured at 23° C. and of at least 0.43 J/mm measured at 0° C., both measured in accordance with ISO 6603) and optical properties (haze values of less than 50% measured on a 1.6 mm thick section of an injection molded article measured in accordance with ASTM 1003. Additionally, thin-wall injection molded articles made from the composition preferably will exhibit excellent stress whitening resistant behavior as evaluated by the whitening effect resulting from a dart impact in a Dart Impact test in accordance with ISO 6603.

EXAMPLES

The polymers disclosed in the examples are the following:
P-E 1 is a blend of (1) 85 weight percent of a propylene-ethylene copolymer having a triad tacticity of at least 93%, an ethylene content of approximately 15 weight percent, a density of 0.857 g/cc, a heat of fusion of 9.6 Joules/gram, a melt flow rate of 8 grams/10 minutes, a molecular weight distribution (Mw/Mn) of 2.5, and has a broad crystallinity distribution, which is made using Catalyst A using a polymerization method similar to the polymerization procedure described below and (2) 15 weight percent of a substantially linear polyethylene (E/O-1), which is an ethylene-1 octene substantially linear polyethylene available from The Dow Chemical Company under the grade designation AFFINITY PL1280 having an ethylene content of 81 weight percent, an octene content of 19 weight percent, a 0.900 g/cc density, a 6 grams/10 minutes melt index, an I10/I2 of 8, a molecular weight distribution (Mw/Mn) of about 2.3 and exhibits a heat of fusion of 95 Joules/gram. The blend has a melt flow rate of 8 grams/10 minutes.

RCP-1 is a nucleated random polypropylene copolymer available from The Dow Chemical Company under the designation R798-42RN, which is made with a Ziegler-Natta catalyst. The resin has a melt flow rate of 42 g/10 min, contains 2000 ppm of Geniset MD LM-30 (a sorbitol-type nucleator/clarifier additive). The resin contained 96.3 percent by weight units derived from propylene and 3.7 percent by weight units derived from ethylene.

E/O-2 is an ethylene-1 octene substantially linear polyethylene available from The Dow Chemical Company under the grade designation AFFINITY EG8185 having an ethylene content of 69 weight percent, an octene content of 31 weight percent, a 0.885 g/cc density, a 30 grams/10 minutes melt index, an I10/I2 of 7.2, and a molecular weight distribution (Mw/Mn) of about 2.2.

Catalyst A

Synthesis of Catalyst A

Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-κ$N^1$,κ$N^2$]dimethyl-

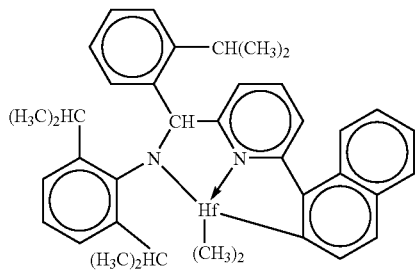

a) 2-Formyl-6-bromopyridine. This compound is synthesized according to literature procedures, *Tetrahedron Lett.*, (2001) 42, 4841.

b) 6-Bromo-2-(2,6-diisopropylphenyl)iminopyridine). A dry, 500 mL 3-neck round bottom flask is charged with a solution of 2-formyl-6-bromopyridine (72.1 g, 383 mmol) and 2,6-diisopropylaniline (72.5 g, 383 mmol) in 500 mL of anhydrous toluene containing 0.3 nm pore size molecular sieves (6 g) and 80 mg of p-TsOH. The reactor is equipped with a condenser, an over head mechanical stirrer and a thermocouple well. The mixture is heated to 70° C. under $N_2$ for 12 h. After filtration and removal of the volatiles under reduced pressure, a brown oil is isolated. Yield was 109 g, 81.9 percent.

GC/MS 346 ($M^+$), 331, 289, 189, 173, 159, 147, 131, 116, 103, 91, 78.

c) 6-(1-Naphthyl)-2-[(2,6-diisopropylphenyl)imino]pyridine. Naphthylboronic acid (54.5 g, 316 mmol) and $Na_2CO_3$ (83.9 g, 792 mmol) are dissolved into 200 mL of degassed 1:1 $H_2O$/EtOH. This solution is added to a toluene solution (500 mL) of 6-bromo-2-(2,6-diisopropylphenyl)-iminopyridine (109 g, 316 mmol). Inside of a dry box, 1 g (0.86 mmol) of tetrakis(triphenyl-phosphine)palladium(0) is dissolved in 50 mL of degassed toluene. The solution is removed from the dry box and charged into the $N_2$ purged reactor. The biphasic solution is vigorously stirred and heated to 70° C. for 4-12 hours. After cooling to room temperature, the organic phase is separated, the aqueous layer is washed with toluene (3×75 mL), the combined organic extracts are washed with $H_2O$ (3×200 mL) and dried over $MgSO_4$. After removing the volatiles under reduced pressure, the resultant light yellow oil is purified via recrystallization from methanol to give a yellow solid. Yield 109 g, 87.2 percent; mp 142-144° C.

$^1$H NMR (CDCl$_3$) δ 1.3 (d, 12H), 3.14 (m, 2H), 7.26 (m, 3H), 7.5-7.6 (m, 5H), 7.75-7.8 (m, 3H), 8.02 (m 1H), 8.48 (m, 2H).

$^{13}$C NMR (CDCl$_3$) δ 23.96, 28.5, 119.93, 123.50, 124.93, 125.88, 125.94, 126.49, 127.04, 127.24, 128.18, 128.94, 129.7, 131.58, 134.5, 137.56, 137.63, 138.34, 148.93, 154.83, 159.66, 163.86.

GC/MS 396 ($M^+$), 380, 351, 337, 220, 207, 189, 147.

d) 2-Isopropylphenyl lithium. Inside an inert atmosphere glovebox, n-butyl lithium (52.5 mmol, 21 mL of 2.5M in hexanes) is added by addition funnel over a period of 35-45 min to an ether solution (50 mL) of 2-isopropyl bromobenzene (9.8 g, 49.2 mmol). After the addition is complete, the mixture is stirred at ambient temperature for 4 h. Then, the ether solvent is removed under vacuum overnight. The next day hexane is added to the remaining white solid and the mixture filtered, washed with additional hexane, and then vacuum dried. 2-Isopropylphenyl lithium (4.98 g, 39.52 mmol) is collected as a bright white powder. A second crop of product (0.22 g) is later obtained from a second filtration of the original hexane filtrant.

$^1$H NMR (d$_8$-THF) δ 1.17 (d, J=6.8 Hz, 6H), 2.91 (sept, J=6.8, 1H), 6.62-6.69 (multiplets, 2H), 6.77 (d, J=7.3 Hz, 1H), 7.69 (multiplet, 1H).

$^{13}$C NMR (d$_8$-THF) δ 25.99, 41.41, 120.19, 122.73, 122.94, 142.86, 160.73, 189.97.

e) 2-pyridinemethanamine, N-[2,6-bis(1-methylethyl)phenyl]-α-[2-(1-methylethyl)phenyl]-6-(1-naphthanlenyl). The imine, 6-(1-naphthyl)-2-[(2,6-diisopropylphenyl)imino]pyridine of step c) (2.20 g, 5.6 mmol) is magnetically stirred as a slurry in 60-70 mL of dry ether under a nitrogen atmosphere. An ether solution of 2-isopropylphenyl lithium (1.21 g, 9.67 mmol in 25 mL dry ether) is added slowly using a syringe over a period of 4-5 min. After the addition is complete, a small sample is removed, quenched with 1N NH$_4$Cl and the organic layer analyzed by high pressure liquid chromatography (HPLC) to check for complete consumption of starting material. The remainder of the reaction is quenched by the careful, slow addition of 1N NH$_4$Cl (10 mL). The mixture is diluted with more ether and the organic layer washed twice with brine, dried (Na$_2$SO$_4$), filtered, and stripped of solvent under reduced pressure. The crude product obtained as a thick red oil (2.92 g; theoretical yield=2.87 g) is used without further purification.

$^1$H NMR (CDCl$_3$) δ 0.96 (d, J=6.6 Hz, 3H), 1.006 (d, J=6.8 Hz, 3H), 1.012 (d, J=6.8 Hz, 6H), 1.064 (d, J=6.8 Hz, 6H), 3.21-3.34 (multiplets, 3H), 4.87 (br s, NH), 5.72 (s, 1H), 6.98 (d, J=7.6 Hz, 1H) 7.00-7.20 (multiplets, 7H), 7.23-7.29 (multiplets, 4H), 7.51 (d, J=7.1 Hz 1H), 7.60-7.65 (multiplets, 2H), 7.75 (multiplet, 1H), 8.18 (multiplet, 1H).

$^{13}$C NMR (CDCl$_3$) δ 23.80, 24.21, 24.24, 24.36, 28.10, 28.81, 67.08, 120.20, 122.92, 123.96, 124.42, 125.35, 125.81, 126.01, 126.28, 126.52, 126.58, 126.65, 127.80, 128.52, 128.62, 129.25, 131.82, 134.52, 136.81, 138.82, 140.94, 143.37, 143.41, 146.66, 159.05, 162.97.

f) Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-κ$N^1$,κ$N^2$]dimethyl- A glass jar is charged with 8.89 mmol of the ligand from step e) dissolved in 30 mL toluene. To this solution is added 8.98 mmol of n-BuLi (2.5 M solution in hexanes) by syringe. This solution is stirred for 1 hour, then 8.89 mmol of solid HfCl$_4$ are added. The jar is capped with an air-cooled reflux condenser and the mixture is heated at reflux for 1 hour. After cooling, 31.1 mmol of MeMgBr (3.5 equivalents, 3.0 M solution in diethyl ether) are added by syringe and the resulting mixture stirred overnight at ambient temperature. Solvent (toluene, hexanes and diethyl ether) is removed from the reaction mixture using a vacuum system attached to the drybox. Toluene (30 mL) is added to the residue and the mixture filtered, and the residue (magnesium salts) is washed with additional toluene (30 mL). Solvent is removed by vacuum from the combined toluene solution, and hexane is added, then removed by vacuum. Hexane is again added and the resulting slurry is filtered and the product washed with pentane to give the desired product as a yellow powder.

$^1$H NMR(C$_6$D$_6$): δ 8.58 (d, J=7.8 Hz, 1H), 8.25 (d, J=8.4 Hz, 1H), 7.82 (d, J=7.5 Hz, 1H), 7.72 (d, J=6.9 Hz, 1H), 7.50 (d, J=8.1 Hz, 1H), 7.36-7.27 (multiplets, 3H), 7.19-6.99 (multiplets, 7H), 6.82 (t, J=8.1 Hz, 1H), 6.57 (s, 1H), 6.55 (d, J=7.8 Hz, 1H), 3.83 (septet, J=6.9 Hz, 1H), 3.37 (septet, J=6.9 Hz, 1H), 2.89 (septet, J=6.9 Hz, 1H), 1.38 (d, J=6.6 Hz, 3H), 1.37 (d, J=6.9 Hz, 3H), 1.17 (d, J=6.9 Hz, 3H), 1.15 (d, J=7.2 Hz, 3H), 0.96 (s, 3H), 0.70 (s, 3H), 0.69 (d, J=5.4 Hz, 3H), 0.39 (d, J=6.9 Hz, 3H).

General Continuous Loop Solution Propylene-Ethylene Copolymerization Procedure

The propylene-ethylene copolymers used in the Examples are made using a polymerization method similar to the polymerization procedure described below. Catalyst A is used to manufacture all the propylene-ethylene copolymers of the Examples.

The polymerization process is exothermic. There are ~900 BTU released per pound of propylene polymerized and ~1,500 BTU released per pound of ethylene polymerized. The primary process design consideration is how to remove the heat of reaction. The propylene-ethylene copolymers are produced in a low-pressure, solution polymerization loop reactor, made up of a 3" loop pipe plus two heat exchanges, the total volume of which is 31.4 gals. Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentrations equal to 18 wt %. The adiabatic temperature rise of the solution accounts for some of the heat removal from the polymerization reaction. Heat exchangers within the reactor are utilized to remove the remaining heat of reaction, allowing for reactor temperature control at 105° C.

The solvent used is a high purity iso-paraffinic fraction purchased from Exxon called Isopar E. Fresh propylene is passed through a bed of Selexsorb COS for purification before mixing with the recycle stream (contains solvent, propylene, ethylene, and hydrogen). After mixing with the recycle stream, the combined stream is passed through a bed of 75 wt % Molecular Sieve 13× and 25 wt % Selexsorb CD for further purification before using a high pressure (700 psig) feed pump to pump the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to the appropriate feed temperature (5° C.). The reactor operates at 525 psig and a control temperature equal to 105° C. The propylene conversion in the reactor is maintained by controlling the catalyst injection rate. The reaction temperature is maintained by controlling the water temperature across the shell side of the heat exchanger at 85° C. The residence time in the reactor is short, 10 minutes. The propylene conversion per reactor pass is 60 wt %.

Upon exiting the reactor, water and additive are injected into the polymer solution. The water hydrolyzes the catalyst, terminating the polymerization reaction. The additives consist of antioxidants, 500 ppm of Irganox™ 1010 and 1000 ppm of Irgafos™ 168, that remain with the polymer and act as stabilizers to prevent polymer degradation while in storage before subsequent fabrication at the end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting. Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

Blending of the Polymers:

The compositions can be made in a simple and inexpensive way by processes known to one of ordinary skill in the art, such as: (a) dry blending of the component pellets; (b) direct feeding of the component pellets via a blender system (volumetric or gravimetric) mounted on an injection molding extruder.

Due to the good compatibility between the clarified random polypropylene copolymer (which makes up the majority of the matrix) and the propylene-ethylene copolymer (which is dispersed within the matrix), dry blending and feeding into a single or twin screw injection molding extruder will sufficiently blend the components. Also, the compositions of the invention may be made by in-reactor processes known to one of ordinary skill in the art, whereby the individual polymer components are made in individual reactors and/or polymerization steps either in series or parallel, with the components being combined into an "in-reactor blend."

The compositions are injection molded into up to 2 mm thick articles in accordance with methods known to one of ordinary skill in the art. The thin-wall injection molded articles generally are at least 500 microns (μm).

In the following examples, round-shaped eleven (11) liter pails with 1.6 mm wall thickness and flat bottoms were utilized. The components were dry blended prior to feeding them into the machine. The machine used to injection mold the pails of the examples is a Netstal SynErgy 420 (extruder screw size 70 mm). The extruder was operated with a temperature profile so that the melt temperature was 220° C.

Subsequent testing on the pails indicates that they exhibit excellent resistance to stress whitening.

Tensile and optical properties were measured on specimen that were cut from the middle of the pail wall in flow direction. Dart Impact properties and stress whitening resistance were measured on specimen cut from the pail bottom.

Examples 1-4

TABLE 1

| Example | RCP-1 | E/O-2 | P-E 1 | Composition Melt Flow Rate (g/10 min) |
|---|---|---|---|---|
| 1 | 92 wt % | 8 wt % | | Not measured |
| 2 | 92 wt % | | 8 wt % | Not measured |

TABLE 1-continued

| Example | RCP-1 | E/O-2 | P-E 1 | Composition Melt Flow Rate (g/10 min) |
|---|---|---|---|---|
| 3 | 95 wt % | | 5 wt % | Not measured |
| 4 | 92 wt % | 5.5 wt % | 2.5 wt % | Not measured |

The compositions of Examples 1-4 are tested for the properties set forth in Table 2, below.

TABLE 2

| EXAMPLE NUMBER | 1 | 2 | 3 | 4 |
|---|---|---|---|---|
| Dart Impact (ISO 6603 @ 23° C.) (J/mm) | 6.99 | 11.13 | 8.45 | 8.41 |
| Dart Impact (ISO 6603 @ 0° C.) (J/mm) | 0.39 | 0.46 | 0.55 | 0.68 |
| % Haze (ASTM D1003) (1.6 mm thick section of injection molded article | 46.3 | 47.2 | 45.8 | 45.2 |
| Tensile-Yield Strength (ISO 527) (MPa) | 23.35 | 22.32 | 23.72 | 22.59 |
| Stress Whitening | High | Low | Low | Medium |

The data in Table 2 demonstrates that all the compositions of the invention result in an excellent balance of optical properties, toughness and stiffness. Example 4 shows that when additional homogeneous ethylene-alpha olefin interpolymer is utilized at levels above the preferred levels, stress whitening resistance can deteriorate resulting in higher levels of stress whitening. For many end-use applications, low stress whitening levels are acceptable, but medium stress whitening levels are not.

We claim:

1. A composition for manufacturing injection molded articles having a wall thickness of between 500 μm and 2.0 mm, the composition comprising a blend of:
   (A) from 2 to 15% by weight of a propylene-ethylene copolymer having substantially isotactic propylene sequences, the propylene-ethylene copolymer comprising:
      (1) at least 75% by weight units derived from propylene and from about 11 to 18% by weight units derived from ethylene;
      (2) the propylene-ethylene copolymer having a melt flow rate from 4 to 30 grams/10 minutes;
   (B) from 85 to about 98% by weight of a random polypropylene copolymer having an ethylene content of from 2.0-5.0 percent by weight, a melt flow rate of from 25 to 130 grams/10 minutes, wherein, the melt flow rate of the blend is from 20 to 125 grams/10 minutes; and
   (C) from 500 to 2500 ppm by weight of a nucleator/clarifier additive based on the weight of the random polypropylene copolymer (B), wherein, the melt flow rate of the composition is from 20 to 125 grams/10 minutes and wherein a 1.6 mm thick section of the injection molded article exhibits:
      (1) room temperature (23° C.) Dart Impact strength by ISO 6603 of at least 7.5 J/mm;
      (2) tensile-yield strength by ISO 527 of between 20 and 30 MPa;
      (3) 0° Dart Impact Strength by ISO 6603 of at least 0.43 to 0.75 J/mm; and
      (4) a value for haze of less than 50% by ASTM 1003.

2. The composition of claim 1, wherein the 1.6 mm thick section exhibits low stress whitening.

3. The composition of claim 1, wherein the propylene-ethylene copolymer has a molecular weight distribution (Mw/Mn) of less than 3.5.

4. The composition of claim 1, wherein the propylene-ethylene copolymer has a melt flow rate of from 5 to 26 g/10 min.

5. The composition of claim 1, wherein the random polypropylene copolymer contains 3 to 4 percent by weight units derived from ethylene.

6. The composition of claim 1, wherein the random polypropylene copolymer has a melt flow rate of from 30 to 60 grams/10 minutes.

7. The composition of claim 5, wherein the random polypropylene copolymer has a melt flow rate of from 40 to 50 grams/10 minutes.

8. The composition of claim 1, wherein composition contains from 4 to 10 percent by weight of the propylene-ethylene copolymer.

9. The composition of claim 1, wherein the 1.5 mm thick section of the injection molded sample exhibits:
   (1) Room temperature (23° C.) Dart impact from 7.5 to 15 J/mm;
   (2) 0° C. Dart Impact from 0.45 to 0.75 J/mm; and
   (3) a value for haze of less than 48% by ASTM 1003.

10. The composition of claim 1, wherein the nucleator/clarifier additive is a sorbitol-type nucleator/clarifier.

11. The composition of claim 10, wherein the nucleator/clarifier is selected from the group consisting of, Geniset MD-LM-30 (1,3,2,4-Di(methylbenzylidene)Sorbitol) and Millad 3988 (1,2,3,4-di-meta, para-methylbenzylidene sorbitol).

12. The composition of claim 10, wherein the nucleator/clarifier is present at a level of between 800 and 2500 ppm based on the weight of the random polypropylene copolymer in the composition.

13. The composition of claim 10, wherein the nucleator/clarifier is present at a level of between 1700 and 2200 ppm based on the weight of the random polypropylene copolymer in the composition.

14. The composition of claim 1, the composition further including a homogeneous ethylene-alpha olefin interpolymer.

15. The composition of claim 14, wherein the homogeneous ethylene-alpha olefin interpolymer is present at between 3 and 25 percent by weight based on the weight of the propylene-ethylene copolymer and the homogeneous ethylene-alpha olefin interpolymer.

16. A thin wall injection molded article having a minimum wall thickness of between 500 μm and 2.0 mm incorporating the composition of claim 1.

17. An injection molded article of claim 16, wherein the articles comprise crates, boxes, pails, houseware articles, furniture, drinking cups, caps and closures.

* * * * *